United States Patent
Bosiers et al.

(10) Patent No.: US 7,336,312 B2
(45) Date of Patent: Feb. 26, 2008

(54) MULTI-MODE CHARGE-COUPLED IMAGER HAVING PLURAL READOUT SAMPLING FREQUENCIES

(75) Inventors: Jan Theodoor Jozef Bosiers, Eindhoven (NL); Agnes Catharina Maria Kleimann, Eindhoven (NL); Laurent Louis Daniel Le Cam, Leuven (BE)

(73) Assignee: DALSA Corporation, Waterloo (CA)

( * ) Notice: Subject to any disclaimer, the term of this patent is extended or adjusted under 35 U.S.C. 154(b) by 945 days.

(21) Appl. No.: 10/170,905

(22) Filed: Jun. 13, 2002

(65) Prior Publication Data

US 2002/0191095 A1    Dec. 19, 2002

(30) Foreign Application Priority Data

Jun. 14, 2001   (EP)   .................. 01202296

(51) Int. Cl.
*H04N 3/14* (2006.01)
*H04N 5/335* (2006.01)

(52) U.S. Cl. .................. 348/321; 348/232; 348/311

(58) Field of Classification Search ................ 348/300, 348/303, 311, 315–317, 319, 320, 323
See application file for complete search history.

(56) References Cited

U.S. PATENT DOCUMENTS 4,837,630 A * 6/1989 Ueda ........................... 348/319
5,040,071 A * 8/1991 Stevens ....................... 348/319
5,291,294 A * 3/1994 Hirota ......................... 348/316
5,491,512 A * 2/1996 Itakura et al. ............... 348/321
5,559,553 A * 9/1996 Bitek .......................... 348/312
5,969,759 A * 10/1999 Morimoto ................... 348/311
5,986,267 A * 11/1999 West ...................... 250/370.08
6,985,182 B1 * 1/2006 Morinaka et al. ........... 348/311
2002/0071046 A1 * 6/2002 Harada ....................... 348/316

FOREIGN PATENT DOCUMENTS

EP            0939544 A2       2/1999
WO           WO9817051         10/1997

* cited by examiner

*Primary Examiner*—Lin Ye
*Assistant Examiner*—Kelly Jerabek
(74) *Attorney, Agent, or Firm*—Fisher Technology Law PLLC (57) ABSTRACT

A charge-coupled imager includes an imaging section, a read-out section, and a way to reduce the number of charge packets for every row read. The imager is switchable between at least two read-out modes. The imaging section includes image elements arranged in a two-dimensional pattern. The read-out section includes at least a first horizontal CCD channel disposed beside the two-dimensional pattern, a second horizontal CCD channel and vertical CCD channels interlineated within the pattern of image elements. The imager is operable so that every image element of a row is individually readable in a first read-out mode using the first horizontal CCD channel comprising n charge storage locations. The imager is further operable in a second read-out mode so that a lower horizontal sampling frequency is read from the read-out section than in the first read-out mode using a second horizontal CCD channel comprising fewer storage locations than n.

19 Claims, 7 Drawing Sheets

Prior Art

MULTI-MODE CHARGE-COUPLED IMAGER HAVING PLURAL READOUT SAMPLING FREQUENCIES

BACKGROUND OF THE INVENTION

1. Field of the Invention

The invention relates to a charge-coupled imager comprising a semiconductor body, a surface of which is provided with an imaging section comprising image elements arranged in a two-dimensional m×n pattern of m horizontal rows and n vertical columns and with a read-out section comprising a horizontal CCD channel beside the two-dimensional pattern for reading the pattern row by row, and vertical CCD channels within the pattern for transporting charge packets to the horizontal CCD channel per column of the image elements. The invention also relates to a camera fitted with such an imager.

2. Description of Related Art

An imager of the type described above is known, for example from patent application PCT/1897/01201 in the name of the applicant, which was published under number WO 98/17051.

As is known, charge-coupled imagers of the type referred to in the opening paragraph are used, inter alia, in electronic "still picture" cameras for capturing a radiation image and converting it into a large number of electric signals, whose size is a measure of the local light intensity. The signals can be stored on a magnetic memory, for example, for further processing, such as display on a monitor. Generally, the imager includes a color filter comprising three or more colors, which allows color imaging. Specific values for the size of the imager are, for example, 960 lines in the vertical direction with 1280 columns.

During operation, an image is projected onto the imaging section for an integration period. Once the integration period is over, the entry of light is blocked by means of a shutter and the charge packets can be read one by one via the horizontal CCD channel. In addition to this read-out mode, which is the normal-mode read-out mode, such imagers generally also comprise a possibility of a second read-out mode, for example for displaying an image on a monitor or an LCD viewer on the camera, in which 15 . . . 30 images are read per second, for example. In practice it has become apparent, however, that it is not easy to read an imager comprising 1 M image elements or pixels twenty-five times per second.

The aforementioned patent application WO 98/1705 discloses an imager having a vertical npn structure, in which a substrate is used which is of the same type as the n-type buried channel, which is separated from the CCD channels by the intermediate, thin p-type layer and can be used as a drain for electrons that need to be removed from the CCD channels. A memory section comprising 240 lines, for example, that is, one fourth of the total number of lines in the imaging section, is formed between the imaging section and the horizontal read-out section. The vertical sampling frequency (the number of samples per unit length in the vertical direction) can be reduced for the second read-out mode by dumping three out of every four lines of the imaging section via the substrate and storing only one line in the memory. As described in the aforesaid application, the non-selected lines can be dumped to the substrate in a simple manner by blocking the charge transport at the interface between the imaging section and the memory.

As the resolution increases, the read-out time will again be too long for generating the desired 15 . . . 30 images per second. Generally it is not possible to increase the clock frequency so as to read more signals per unit time, because this would automatically lead to an unacceptably low signal-to-noise ratio. It is not advisable to just reduce the number of signals per line, on account of the fixed length, and thus the fixed number of cells to be read, of the horizontal register.

SUMMARY OF THE INVENTION

It is, inter alia, an object of the invention to provide an imager whose line read-out time can be reduced by decreasing the horizontal sampling frequency. A charge coupled imager of the type described in the opening paragraph is characterized in that, in order to make the read-out possible, the imager comprises means for reducing the number of charge packets for every row to be read, and in that the imager is switchable between two read-out modes, in which every image element of a row is individually readable in the first read-out mode, using a horizontal CCD channel comprising at least n charge storage locations, and in which a row having a lower horizontal sampling frequency than in the first read-out mode is read in the second read-out mode, using a horizontal CCD channel comprising only n−q charge storage locations. The read-out time of a line can be reduced in an effective manner by combining the reduction of the number of signals in a line with a corresponding reduction of the number of charge storage locations (cells) in the horizontal register. This makes it possible to record an image with a sufficiently high frequency with the imager and to process it, for example for monitor-mode display on an LCD viewfinder on the camera.

A dual resolution charge-coupled imager includes an imaging section, a read-out section, and a way to reduce the number of charge packets for every row to be read. The imager is switchable between at least two read-out modes. The imaging section includes image elements arranged in a two-dimensional pattern of m horizontal rows and n vertical columns where n and m are natural numbers. The read-out section includes at least a first horizontal CCD channel disposed beside the two-dimensional pattern, a second horizontal CCD channel and vertical CCD channels interlineated within the pattern of image elements. The imager is operable so that every image element of a row is individually readable in a first read-out mode using the first horizontal CCD channel comprising at least n charge storage locations. The imager is further operable in a second read-out mode so that a lower horizontal sampling frequency is read from the read-out section than in the first read-out mode using a second horizontal CCD channel comprising only n−q charge storage locations where q is a natural number smaller than n. The n−q charge locations within the second horizontal CCD channel are substantially uniformly distributed over the width of the imaging section. The width of each charge storage location in the second horizontal CCD channel is larger than the width of a charge storage location in the first horizontal CCD channel.

BRIEF DESCRIPTION OF DRAWINGS

These and other aspects of the invention will be elucidated hereinafter with reference to some embodiments and the following drawings.

DETAILED DESCRIPTION OF PREFERRED EMBODIMENTS

A first type of charge-coupled imager according to the invention is characterized in that the read-out section includes at least two horizontal CCD channels, in which one of said CCD channels, which is intended for use in the aforesaid first read-out mode, comprises at least n storage locations, and in which the other CCD-channel, which is intended for use in the second read-out mode, comprises n–p storage locations. Since the aforesaid other CCD channel comprises a lower number of storage locations than the first horizontal CCD channel, the other CCD channel can be read within a shorter period of time than the first CCD channel while operating at the same clock frequencies. The two second horizontal CCD channels can be arranged one beside the other on one side of the imaging section, the channel with the large number of storage locations being formed first, as seen from the imaging section, followed by the channel with the lower storage locations, which second channel can be filled via the first channel. Advantageously, the two horizontal readout registers can be arranged on opposite sides of the imaging section, in which the direction of the charge transport in the vertical CCD channels is determined by the selected read-out mode.

In monitor mode (real time), the recorded images are preferably stored during the horizontal read-out, in a memory which is shielded from incident light, whilst a new image is recorded in the imaging section. Accordingly, another embodiment of a charge coupled imager according to the invention is characterized in that a memory matrix which is shielded from incident light is present between the imaging section and the second CCD channel, in which memory section charge packets which have been generated in the imaging section during an integration period are stored temporarily before being read row by row. An important embodiment, in which the number of samples is reduced both in the horizontal and in the vertical direction, is characterized in that the number of rows in the memory matrix is lower than in the imaging section.

As disclosed in the aforesaid patent application WO 98/170351, it is relatively easy to reduce the sampling frequency in the vertical direction in an imager which, in addition to an imaging section, comprises a storage section, by storing only a number of selected lines in the memory and dumping the other lines at the interface between the imaging section and the memory section by blocking the charge transport in the memory. This is possible because of the fact that the imaging section and the memory section are controlled separately. Since the selection takes place before lines are stored in the memory, the memory can be small in comparison with the imaging section, thus preventing the imager area becoming very large.

Another embodiment is characterized in that the memory matrix is made up of a number of juxtaposed CCD channels having a width which corresponds to the overall width of a number of juxtaposed columns in the imaging section, in which charge packets originating from several columns are combined upon being transported from the imaging section to the memory matrix. In this embodiment, the horizontal reduction of the number of samples takes place at least partially by combining charge packets, with the advantage of obtaining a greater sensitivity in comparison with the system in which charge is drained (which system could also be used).

Another embodiment is characterized in that draining means are present for draining charge packets at the interface between the imaging section and the memory section to columns lying between columns of which the charge packets which have been formed therein are not drained but stored in the memory section. The combination of combining and draining charge packets can be used advantageously in imagers which are intended for color imaging. An important embodiment, in which the color information is retained upon reduction of the lateral sampling frequency, is characterized in that the imaging section is provided with a color filter, in which the charge packets which are being combined correspond to an identical color and charge packets which are being drained correspond to a different color.

A second type of charge-coupled imager according to the invention, in which only one read-out register suffices, is characterized in that the horizontal CCD channel is used in both read-out modes, and in that the number of electrodes per charge storage location is varied in both read-out modes. Thus, the horizontal register can be operated as a 4-phase CCD in the first read-out mode, for example, and as an 8-phase CCD in the second read-out mode. An important embodiment is characterized in that in the first read-out mode, in which a complete row is read, different clock voltages are applied to juxtaposed electrodes of the horizontal CCD channel, and in that in the second read-out mode, in which only a reduced number of charge packets of every row are read, the same clock voltage is applied to juxtaposed electrodes of the horizontal CCD channel. Increasing the size of the charge storage locations, that is, the number of electrodes per cell, in the second read-out mode, in which the number of samples per line is reduced, makes it possible to reduce the number of charge storage locations, as a result of which the time required for reading a line can be reduced while operating at an unchanged clock frequency. It is noted that in this connection the term "the same clock voltage" is to be understood to include not only embodiments in which equal voltages are applied to juxtaposed electrodes, but also embodiments in which a UC voltage is present between said electrodes. One of the advantages of such a DC voltage is the fact that a drift field is formed in the channel, which is advantageous for the charge transport. Furthermore, the presence of the DC voltage makes it possible to operate the device as a 2-phase CCD in certain embodiments.

An important embodiment of such an imager is characterized in that said means for reducing the number of charge packets of every row include means which are present at the interface between the vertical CCD channels and the horizontal CCD channel and which make it possible to transport a first subgroup of the charge packets of a row in a first step and subsequently, in a second step, a second subgroup to the horizontal CCD channel. In the first read-out mode (with a maximum sampling frequency), the two groups can be transported intermittently to the horizontal register, after which the register is read in a usual manner. In the second read-out mode, the charge packets of the first subgroup can first be drained off, after which the charge packets of the second subgroup are placed in the horizontal register and subsequently read. A preferred embodiment, which has the advantage of a high sensitivity, is characterized in that after the charge packets of the first subgroup have been transported in the horizontal CCD channel, said charge packets are transported in the horizontal CCD channel to charge storage locations to which the charge packets of the second subgroup are transported in said second step, after which said charge packets of the second subgroup are transported in the horizontal CCD channel and added to the charge packets of the first subgroup that are present at that location.

The imager may be suitable for use as a black-and-white imager or, if a color splitter is used, for recording a single color image. An important further embodiment is characterized in that the imaging section includes a color filter, in which the charge packets that are being joined in the horizontal CCD channel correspond to an identical color.

Various techniques can be used advantageously for transporting the charge packets of the two (or more) subgroups separately in the horizontal read-out channel. A further embodiment, which has this advantage, amongst others, that besides the normal clock voltages that are required for the selective charge transport in the vertical channels no additional clock voltages are required for the selective charge transport to the read-out section, is characterized in that said means for selectively transporting charge packets of the first and the second subgroup to the horizontal CCD channel in two steps are made up of a Q-phase system of electrodes above the vertical CCD channels (Q being a natural integral larger than 1), in which the last electrode of the vertical CCD channels associated with the first subgroup corresponds to a different phase than the last electrode of the vertical CCD channels associated with the second subgroup.

For similar reasons as with regard to an above-described imager of the first type, a charge-coupled imager of the second type is preferably provided with a small memory for use in the second read-out mode. Accordingly, a further embodiment is characterized in that a part of the vertical CCD channels adjacent to the read-out section forms a memory which is shielded from incident light, which memory is present between the imaging section and the read-out section and whose number of rows is smaller than the number of rows in the imaging section.

It is noted that the invention will be described hereinafter on the basis of an imager of the type in which the charge transport channels of charge-coupled devices are used not only for charge transport but also as photosensitive elements which convert absorbed radiation into an electric charge which is stored in the charge storage elements and is transported to a horizontal read-out register via said (vertical) channels after an image has been recorded. From the description it will be quite apparent, however, that the invention can also be used in imagers of the interline type, in which the photosensitive elements are formed by diodes, for example, which are arranged in lines and columns, with vertical CCD channels (shielded from incident light) being arranged between said columns. In this device, an image is recorded and converted into electric charge by the diodes, after which the charge packets thus formed are transferred to the vertical CCD channels and transported to a horizontal read/out register via said channels. The CCD channels only function to transport charge, therefore, and not to convert electromagnetic radiation into electric charge as well, as in the first type of imager. Furthermore it is noted that FIGS. 1 and 2 are not complete, and that, for example, the electrodes to which voltages are applied for controlling the storage and the transport of the charge packets are not shown for the sake of clarity.

Figure 1:
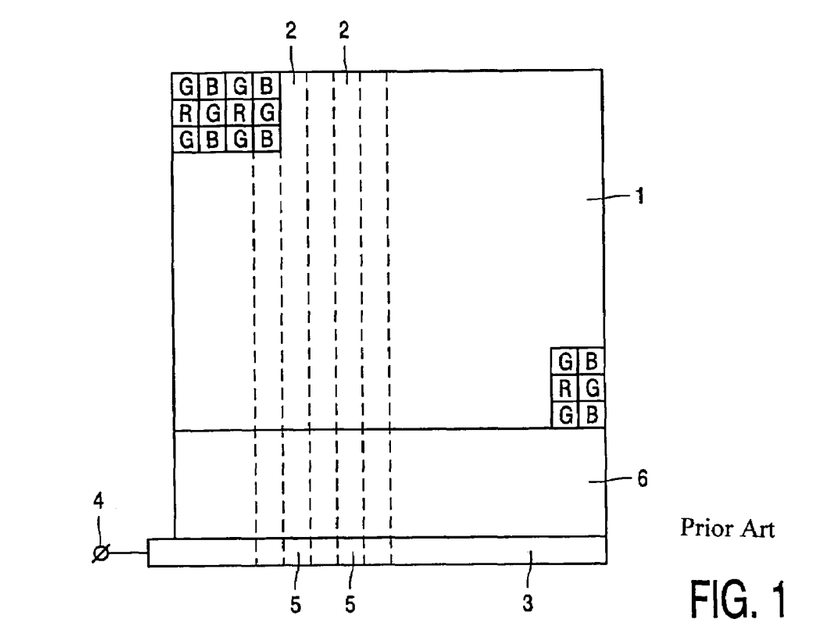
FIG. 1 is a schematic view of a charge-coupled imager which is known per se.

FIG. 1 shows an imager of the first type (frequently referred to as the frame transfer type or the FT type in the literature), as described, inter alia, in the aforesaid patent application WO 90/17051. The imager includes an imaging section 1, comprising a number of vertical CCD channels 2 arranged one beside the other, whose boundary is illustrated in broken lines for a few channels. The number of CCD channels is determined by the specific application, in the case of a still picture camera it is, for example, 1280 (setting aside possible single additional channels for dark reference, which are shielded from light). The height of the imaging section I is determined by the desired number of lines, for this specific application it will be 960, for example. Furthermore, a mosaic color filter is provided on the surface of the imaging section, in this example a mosaic:

G B G B . . .
R G R G . . .
G B G B . . . etc., wherein the letters G, B and R represent green, blue and red, respectively. The dimensions and the location of the color filter correspond to the imaging elements in the imaging section 1. Of course it is also possible to use filters comprising other colors, or stripe filters instead of mosaic filters. The imager furthermore comprises a horizontal read-out register 3 having an output 4 for serial read-out of the grid signals. To that end, the register 3 is so designed that the position and the number of the charge storage locations 5 in the horizontal register correspond to the position and the number of the vertical CCD channels in the imaging section. Arranged between the imaging section 1 and the read-out register 3 is a memory section 6, which is made up of a radiation-shielded extension of the channels 2. The width of the memory is identical to the width of the imaging section and amounts to 1280 pixels, therefore. The height is 240 lines, for example, which is only one fourth of the number of lines of the imaging section. This reduction of the number of lines, which makes it possible to read more images per unit time and in which the sampling frequency in the vertical direction is reduced, is also called (vertical) subsampling. The redundant lines can be dumped in a simple manner by blocking the charge transport in the memory 6 at the interface between the imaging section 1 and the memory 6, as described in the aforesaid patent application WO 98/17051, as a result of which a line that is present at the interface is dumped via the substrate. The lines that are stored in the memory can be selected so that the color information is retained. The information that is stored in the memory can subsequently be transported line by line in the horizontal register 3, which comprises at least 1280 charge storage locations or cells, that is, one cell for every vertical column. The signals from a line in the register 3 can then be read in succession at output 4. Once the entire line has been read, a subsequent line from the memory 6 is read. In the situation in which a complete grid is to be read, the entry of light is blocked after an integration period, for example by means of a shutter, and the lines are read one by one via the horizontal register 3, in which the matrixes 1 and 6 can both be used as a memory.

Figure 2:
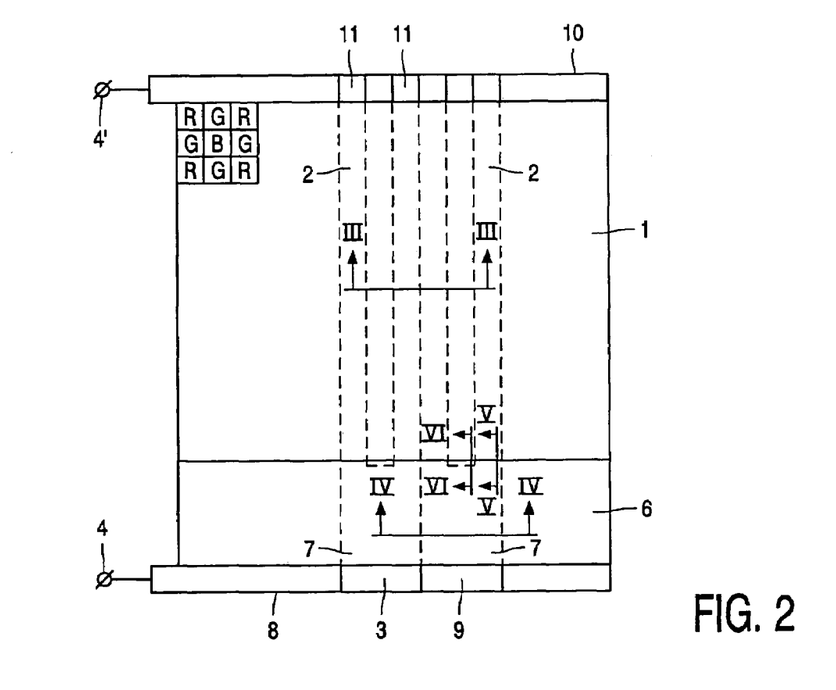
FIG. 2 is a schematic view of a charge-coupled imager according to a first aspect of the invention.

FIG. 2 schematically shows a charge-coupled imager according to the invention, in which it is possible, possibly in combination with the above-described vertical subsampling, to use horizontal subsampling, that is, a reduction of the number of signals per line by decreasing the horizontal sampling frequency. Also this imager comprises an imaging section 1 including mutually separated vertical channels 2 and an adjacent memory matrix 6. The (vertical) channels 7 in the memory section 6 have a width that corresponds to the width of the number of K (in this example K=3) vertical channels in the imaging section, as a result of which it is possible to combine the signals from columns arranged adjacently to each other and thus reduce the number of signals per line. The memory 6 is adjacent to a horizontal read-out register 8, in which the size of the charge storage locations 9 corresponds to the width of the channels 7 in the memory section. The number of charge storage locations in the register 8 is thus reduced by a factor of K in comparison with the number of charge storage locations 5 in the imager of FIG. 1, which makes it possible to reduce the read-out time of a line by a factor of K at unchanged clock frequencies, Since the horizontal register 8 is not suitable for reading a complete grid, a second horizontal read-out register 10, whose construction is identical to that of the register 3 in FIG. 1, is arranged at the upper side of the imaging section 1. Consequently, the register 10 comprises charge storage locations 11 that each correspond to a vertical channel 2 in the imaging section 1. If a complete grid is to be read, voltages are applied to the clock electrodes, such that the charge packets are transported up in the charge transport channels 2, and the lines are transported in the register 10 one by one, after which the signals are read at the output 4' in a usual manner. The reversal of the charge transport in the imaging section can be effected in a simple manner, for example in 3 or 4-phase CCDs not having a specific direction of transport, as is frequently the case in 2 phase systems, for example.

In the case of a black-and-white camera or in the case of a monochromatic image, it is possible to combine the charge packets of the two, three or more channels 2 that are associated with a common charge storage location 9 into one charge packet per line in the horizontal register 8. In the present case, in which the imager includes a color filter, it is advantageous to retain the color information in the second read-out mode as well. To that end, only two charge packets out of every group of three are combined, namely those packets that are associated with an identical color, whilst the charge packet of the remaining color is removed. It is easy to verify that the pattern of charge packets of a line in the memory section being stored represents the colors . . . B, G, B, . . . or R, G, R, G, . . . again. Using the same clock frequencies, the time required for reading the register 8 amounts to only one third of the time required for reading the register 10.

Figure 3:
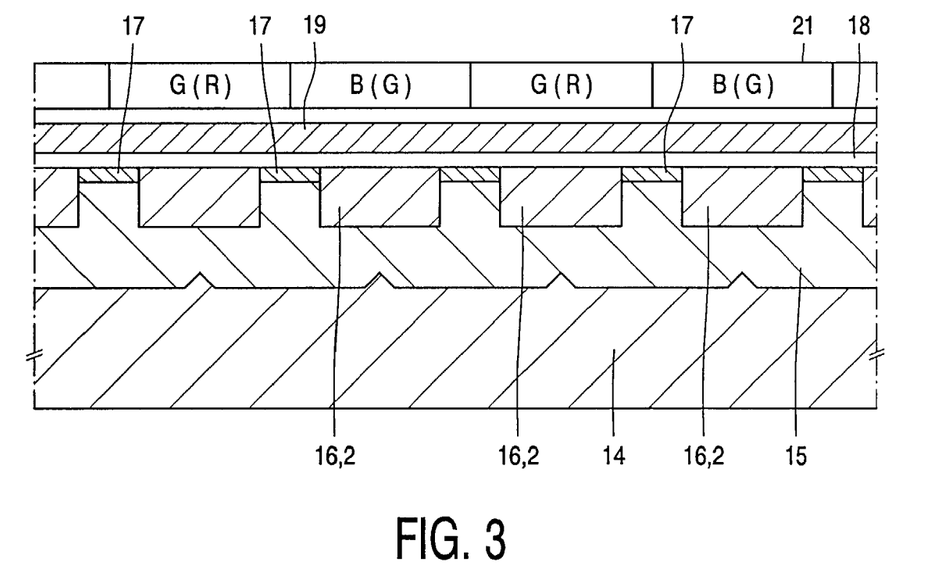
FIG. 3 is a sectional view of this device along the line III-III in FIG. 2.
Figure 4:
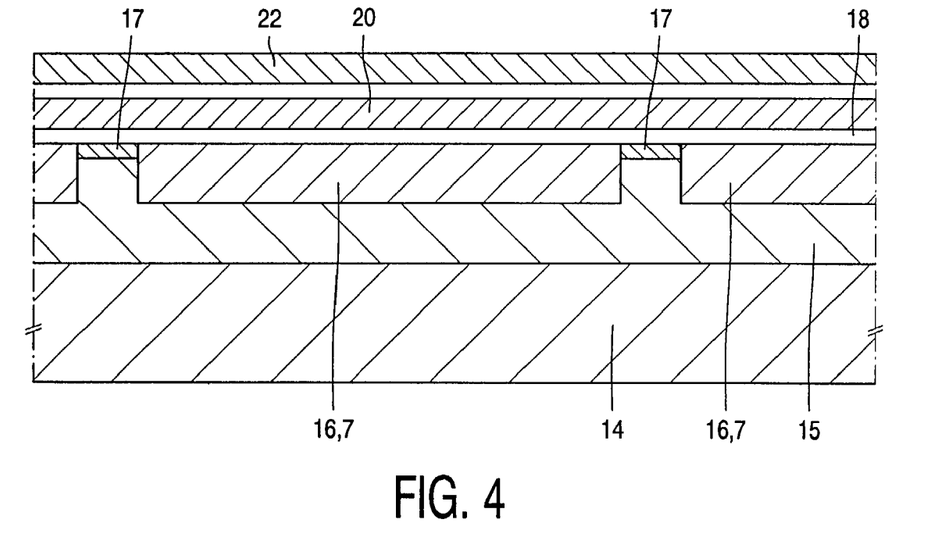
FIG. 4 is a sectional view of this device along the line IV-IV.
Figure 5:
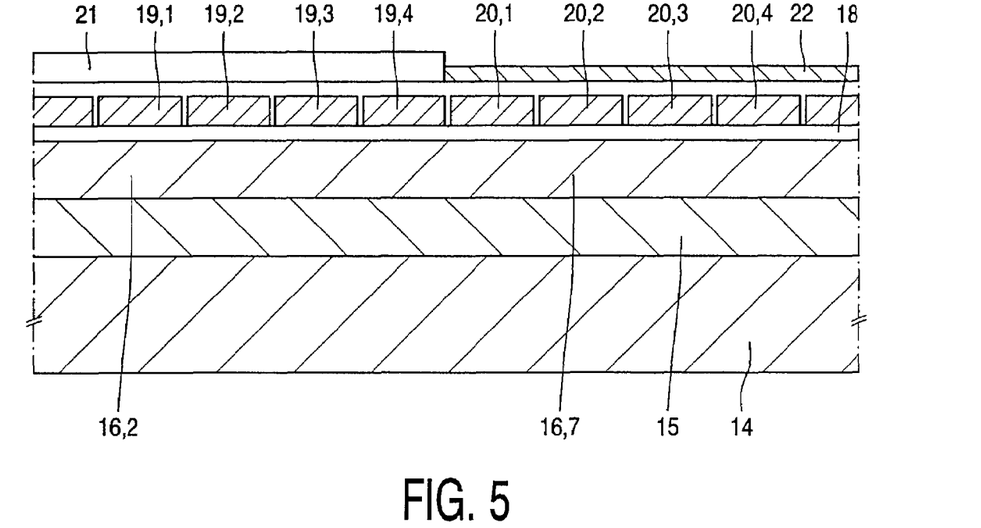
FIG. 5 is a sectional view of this device along the line V-V.
Figure 6:
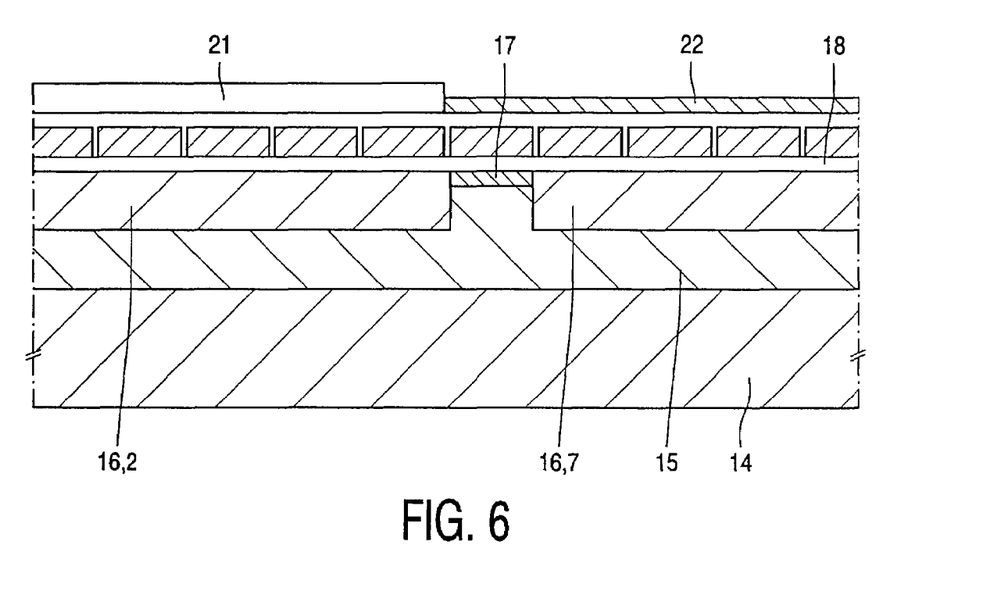
FIG. 6 is a sectional view of this device along the line VI-VI.

The construction of the imager will now be described with reference to the sectional views of FIGS. 3 to 6. The present example of an n-channel device proceeds from the use of an n-type silicon body 14, which is provided on the surface thereof with a well 15 of the opposite conductivity type, in this case of the p-type, therefore. The charge transport channels 2, 7, 8 and 9 of, respectively, the imaging section 1, the memory 6, the horizontal register 8 and the horizontal register 10 are made up of n-type zones 16 that are formed in the well. As can be seen in FIG. 3, which shows a cross-section of the imaging section 1, the well 15 can be arranged in the imaging section 1 in the form of subzones, which overlap under the zones 16.2 in this example (numeral 2 indicates that the zones 16 in FIG. 3 form the channels 2 of the imaging section). As a result, the overall dosage of p-type ions under the channels is slightly lower than would be the case if a uniform dosage were used in the imaging section, which has significant advantages with regard to the vertical charge transport of electrons from the channels 2 to the substrate 14. In order to prevent crosstalk between adjacent n-type zones 16, the surface concentration in areas 17 of the p-type well 15 between the n-type zones can be increased. It is noted that it appears from FIGS. 3 and 4 that the width of the channels 16.7 corresponds to three channels 16.2 in the imaging section (including intermediate areas 17 of the p-well 15). In FIG. 5, which presents a sectional view of the imager at the location of a CCD channel 2 whose signals are stored in the memory, the zones 16.2 and 16.7 can form a continuous zone. With the channels 2 whose signals are not stored, on the other hand, the zones 16.2 and 16.7 are separated from each other by a p-type channel interrupter zone 16, as is shown in FIG. 6.

The surface of the silicon body is covered with a dielectric layer 18 of silicon oxide or a combination of insulating materials, such as silicon oxide and silicon nitride. This layer, which forms a gate dielectric, separates the semiconductor body from the usual clock electrodes of the imaging section 1, the memory section 6 and the horizontal read-out registers 8 and 10. FIGS. 3 and 4 show, respectively, an electrode 19 for the imaging section and an electrode 9 for the memory section. FIGS. 5 and 6, which are sectional views parallel to the direction of transport, show several electrodes of the imaging section and the memory section. The imaging section and the memory section can be operated as 4-phase systems, for example. For this reason, the electrodes of the imaging section and the memory section are denoted by numerals 19.1 . . . 19.4 and 20.1 . . . 20.4, respectively, with the second figure indicating the phase. Arranged above the imaging section 1 is the color filter 21 with the colors red (R), green (G) and blue (B). FIG. 3 shows the two possibilities that can occur, depending on the line along which the section is taken. The memory section 6 is covered with a shielding layer 22, for example of Al, in order to prevent an electric charge being generated upon storage of an image in the memory as a result of absorbed radiation. Such a shielding layer is also present above the horizontal registers 8 and 10.

During operation, an image is projected onto the imaging section for a certain period of time, the integration time, and converted into a patter of charge packets. In the first read-out mode, the entry of light is blocked, for example by means of a shutter, and the lines are read one by one via the read-out register 10, starting with the upper line, that is, line 1, followed by lines 2, 3, etc. During this read-out, the charge transport in the imaging section I takes place upwards from below. Once the entire matrix has been read and the imaging section is empty again, a new image can be recorded. In the second read-out mode, the lines are transported downwards at high speed in the direction of the memory, in which selected lines (one in four) are stored in the memory 6 and the remaining lines are dumped via the substrate 14. The selection is carried out in such a manner that the color information is retained also in vertical direction. At the same time, charge packets are drained off in whole columns via the substrate and other columns are combined, as a result of which the number of charge packets per line in the memory 6 is only one third of the number of charge packets per line in the imaging section. The information stored in the memory can be read via the register 8, whilst a new image can be recorded in the imaging section at the same time now.

As a result of the reduction of the number of samples, both in vertical direction and in horizontal direction, it is possible to record sufficient images per unit time, for example 15 . . . 30 images per second, for direct display on a monitor. Of course it is possible to combine more than two columns per line so as to obtain a further reduction of the number of charge packets while retaining the color information. Thus, the charge of the columns 1+3+5; 6+8+10; 11+13+15; etc. can be formed with 1:5 subsampling (with the columns being numbered 1,2,3,4, etc. from the left to the right). The charge of the columns 2, 4, 7, 9 is drained off via the substrate in the above-described manner by breaking the connection between these columns and the memory 6 by means of the channel stopper.

Figure 7:
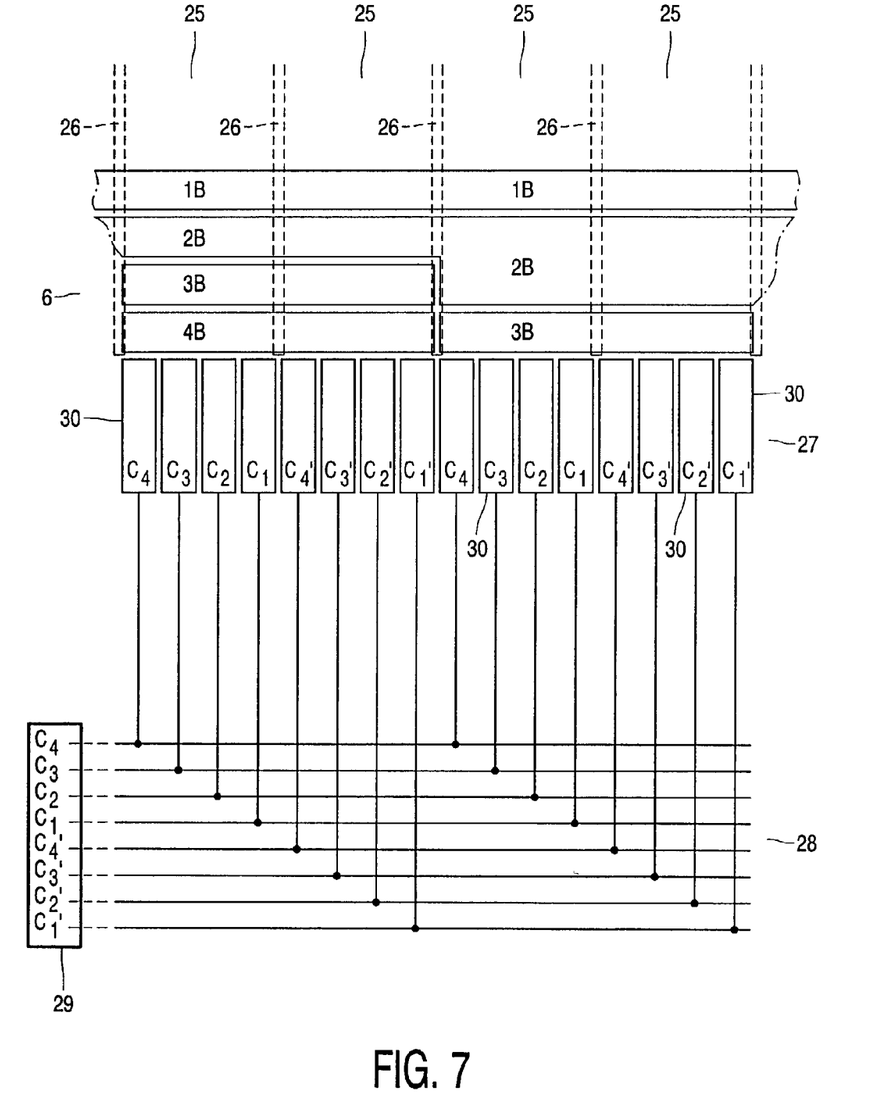
FIG. 7 is a top plan view of a charge-coupled imager according to a second aspect of the invention.

Now an embodiment in which a horizontal read-out register is used in both read-out modes, that is, both in the high sampling frequency read-out mode and in the low sampling frequency read-out mode, will be described by means of an example as shown in FIG. 7. FIG. 7 shows part of the memory section 6 comprising vertical CCD channels 25, which are separated from each other by channel-bounding zones 26, which are illustrated in broken lines in the drawing. The number of lines of the memory section 6 is assumed to be small in comparison with the number of lines of the imaging section that is not shown in FIG. 7. It is assumed that the imaging section is provided with a color filter identical to, that of the imaging section 1 in the preceding example. Since the reduction of the number of signals does not take place at the interface imaging section-memory section, as in the preceding example, and all signals are transported in the common read-out register via the memory in the first read-out mode, as will be described hereinafter, the memory 6 in principle comprises the same number of vertical CCD channels 25 as the imaging section, in which the width of the CCD channels in the memory section is equal to or practically equal to the width of the CCD channels in the imaging section. For example, the memory 6 is configured as a 4-phase CCD comprising four channels per charge packet, indicated at 1B, 2B, 3B and 4B in the drawing. In the drawing, only the last four electrodes for the interface memory-horizontal register are shown together with the associated phase.

Only the electrodes 30 of the horizontal read-out register 27 are shown, which electrodes are connected, via eight clock lines 28, to a clock voltage source 29 that supplies the clock voltages C1-C4, C1'-C4'. For the sake of simplicity, the electrodes 30 of the register 27 are indicated C1, C2, C3, . . . C1', C2', C3', etc. for case of distinction. The size of the electrodes 30 has been selected so that the total length of four electrodes 30 corresponds to the width of a vertical CCD channel 25.

Figure 8:
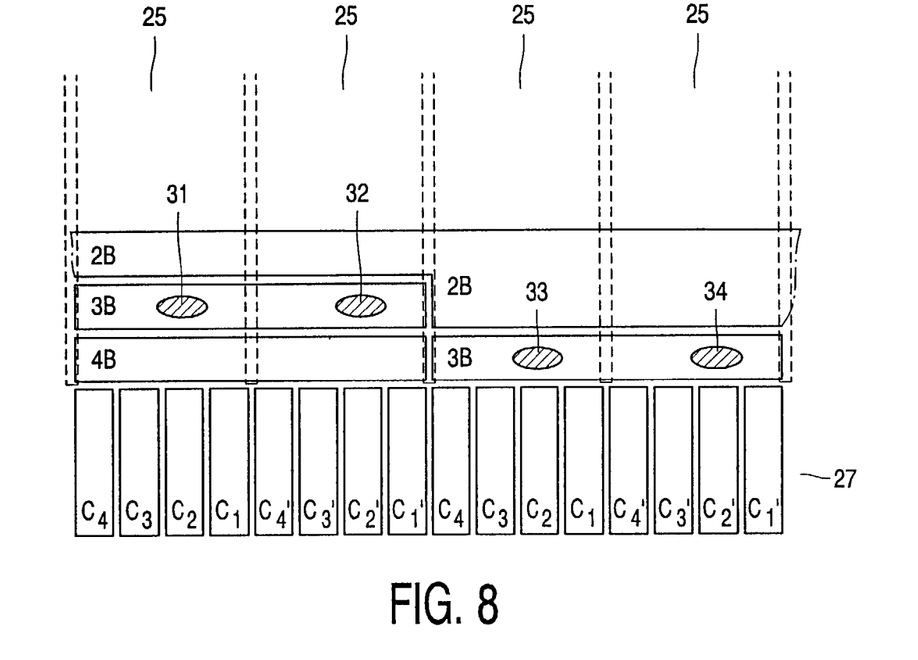
FIGS. 8 to 12 show a few stages of the first and the second read-out mode of this imager.
Figure 9:
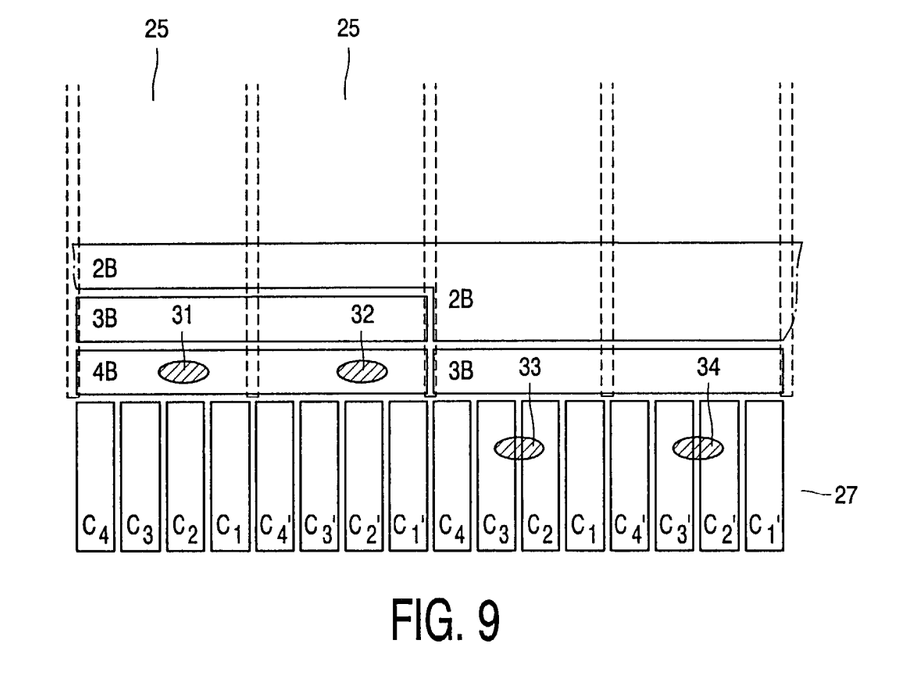

The operation of the imager will now be explained with reference to FIGS. 8, 9 and 10, which show the last electrodes B of the memory and a number of electrodes C of the read-out register 27, and which furthermore show four charge packets 31, 32, 33 and 34 (which correspond to, respectively, an R, G, R, G signal, for example) during a number of steps of the charge transport. FIG. 8 shows the situation in which the charge packets 31 to 34 are stored under the electrode 3B, noting that the packets 33 and 34 are nearer to the horizontal register 27 than the packets 31 and 32. In a subsequent stage, which is shown in FIG. 9, the packets 33 and 34 have been moved in the horizontal register 27, whilst the packets 31 and 32 have been stored under the last electrode, that is, electrode 4b, of the memory. It is noted that at this stage the register 27 is operated as a 4-phase CCD, in which C1=C1', C2=C2', C3=C3' and C4=C4'. In the first read-out mode, that is, the high horizontal sampling frequency read-out mode, in which all the signals of a line are read separately, the signals 31 and 32 are subsequently placed in the horizontal register 27, whilst the packets 33 and 34 remain in place. The register 27 is completely filled in that case and it can be read in a conventional manner, in which the register 27 is operated as a single 4-phase CCD under the aforesaid condition: Ci=Ci'(i=1, 2, 3 or 4).

Figure 10:
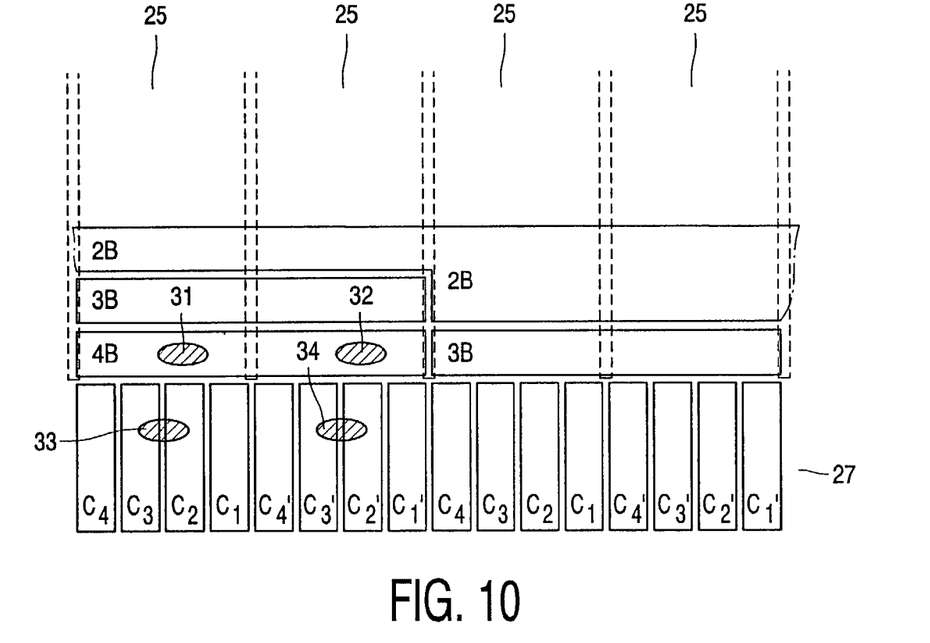
Figure 11:
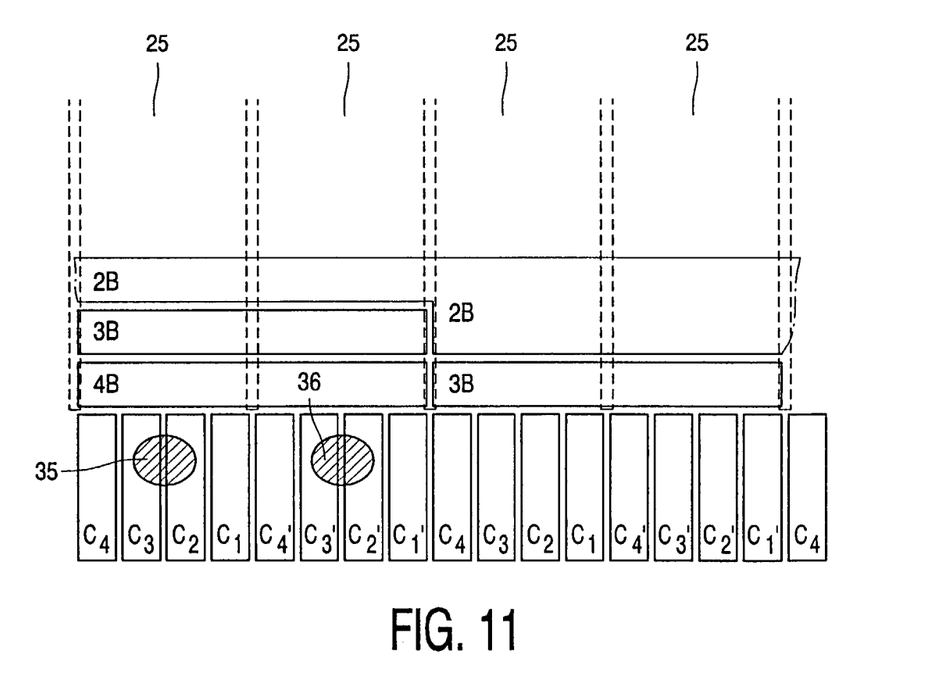
Figure 12:
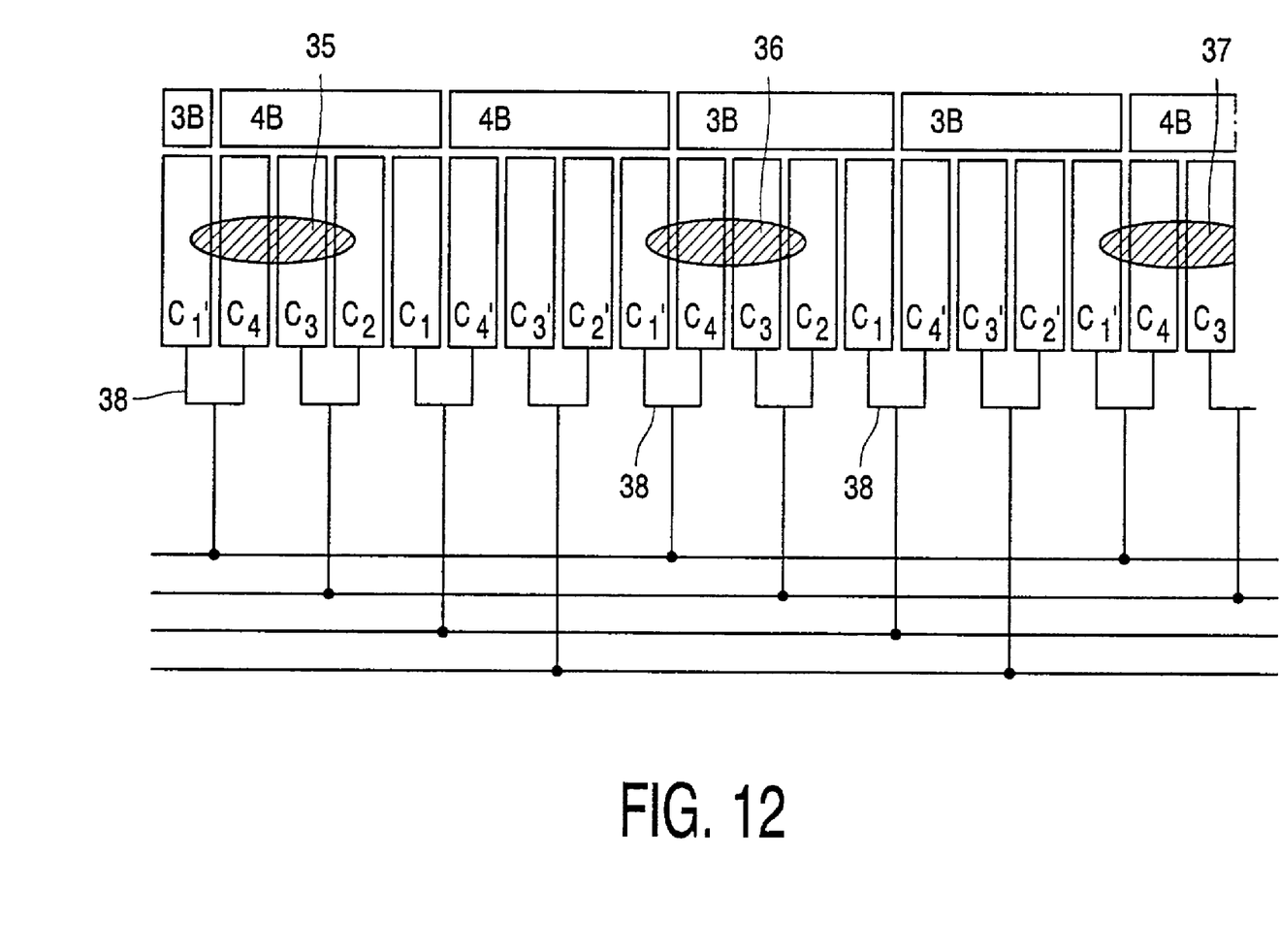

In the second read-out mode, the signals 33 and 34 are placed in the horizontal register 27 in a first step; following that, the signals 33 and 34 are moved in the register over a distance of two columns 25, whilst the signals 31 and 32 remain stored under an electrode 4B, as is shown in FIG. 10. In a subsequent phase, which is illustrated in FIG. 11, the signals 31 and 32 are also placed in the horizontal register 27, where they form combined signals 35 and 36, respectively, with the signals 33 and 34, respectively, which correspond to an identical color, so that the color information is not lost. At this stage, a whole line of the imaging section (memory section) has been transferred to the register 27, which is only half full, however. In order to read the charge packets at an accelerated rate, the voltage source 29 applies such voltages that the following holds: C1=C4, C2=C3, C4=C1' and C2'=C3', as a result of which the same voltage is applied to pairs of adjacent electrodes each time. As a result, the register 27, which is operated as a 4-phase CCD in this situation as well, is provided with electrodes having twice the length of the electrodes Ci and Ci'. Thus, also the number of storage locations in the register 27 has been halved in comparison with the number of storage locations in the first read-out mode, as a result of which it is possible to read the register 27 twice as quickly. For the charge transport in the register 27 in the second read-out mode, reference is made to FIG. 12. In this drawing, only the associated last electrode 3B or 4B of each vertical channel 25 is indicated. The combining of adjacent electrodes into a new electrode is schematically represented by the connections 38. In addition, a further charge packet 37 is shown. In order to obtain a uniform distribution of the charge packets over the register, the packets are first redistributed, with a higher voltage being applied to the other electrodes while maintaining a low or blocking voltage on the electrodes C1, C4'. As a result, the charge packet 35 extends to the left and the charge packet 36 extends to the right. If the low voltage is also applied to the electrode pairs C2', C3', the uniform charge distribution as shown in FIG. 12 will be obtained. The register 27 can then be operated as a 4-phase CCD in a usual manner in order to read the charge packets.

In a variant of the above-described example, the clock voltages that are applied to adjacent electrodes are not identical to each other, as is schematically shown in FIG. 12, but the horizontal register 27 is operated as an 8-phase CCD in the second read-out mode for reading the charge packets 35, 36, 37 etc. (FIG. 12).

It will be understood that the invention is not limited to the above-described examples, but that quite a few variations within the scope of the invention are possible to those skilled in the art. In the second example, the lengths of the last electrodes 3B and 4B may differ from each other, for example, in order to ensure sufficient charge storage, on the one hand, and a satisfactory transport efficiency, on the other hand. Also embodiments comprising different divisions of the B electrodes are possible, for example when a color filter comprising three colors is used in every line. If it is not desirable to add up charge packets, as in the second example, an additional drain and gate can be arranged under the horizontal register. In that case, proceeding from the stage that is shown in FIG. 9, the charge packets 33 and 34 can be drained off via the additional drain, after which the charge packets 31 and 32 are transported in the horizontal register. After redistribution of these charge packets over the register 27, the line can be read in the above-described manner. In the second example, the imager can also be read only with horizontal subsampling or only with vertical subsampling.

The invention claimed is:

1. A charge-coupled imager comprising an imaging section, a read-out section, and means for reducing the number of charge packets for every row to be read, the imager being switchable between two read-out modes, wherein:
   the imaging section comprises image elements arranged in a two-dimensional pattern of m horizontal rows and n vertical columns wherein n and m are natural numbers;
   the read-out section comprises a horizontal CCD channel disposed beside the two-dimensional pattern and vertical CCD channels interlineated within the pattern of image elements;
   the imager is operable so that every image element of a row is individually readable in a first read-out mode using the horizontal CCD channel comprising at least n charge storage locations;
   the imager is further operable in a second read-out mode so that a lower horizontal sampling frequency is read from the read-out section than in the first read-out mode using the horizontal CCD channel operated to comprise only n–q charge storage locations wherein q is a natural number smaller than n;
   the n–q charge locations within the horizontal CCD channel are substantially uniformly distributed over the width of the imaging section; and
   a number of electrodes per charge storage location is lower in the first read-out mode in which a complete row is read than in the second read-out mode in which only a reduced number of charge packets of every row are read.

2. A charge-coupled imager as claimed in claim 1, characterized in that different clock voltages are applied in the first read-out mode to juxaposed electrodes of the horizontal CCD channel, and that in the second read-out mode, in which only a reduced number of charge packets of every row are read, the same clock voltage is applied juxaposed electrodes of the horizontal CCD channel.

3. A charge-coupled imager as claimed in claim 2, characterized in that the horizontal CCD channel forms a k-phase register, in which a charge storage location corresponds to k electrodes in the first read-out mode and to A×k electrodes in the second read-out mode, wherein A is the reduction factor of the number of charge packets to be used.

4. A charge-coupled imager as claimed in claim 2, characterized in that said means for reducing the number of charge packets of every row include means which are present at the interface between the vertical CCD channels and the horizontal CCD channel and which make it possible to transport a first subgroup (33, 34) of the charge packets of a row in a first step and subsequently, in a second step, a second subgroup (31, 32) to the horizontal CCD channel.

5. A charge-coupled imager as claimed in claim 4, characterized in that after the charge packets (33, 34) of the first subgroup have been transported in the horizontal CCD channel, said charge packets are transported in the horizontal CCD channel to channel storage locations in which the charge packets (31, 32) of the second subgroup are transported in said second step, after which said charge packets of the second subgroup are transported in the horizontal CCD channel and added to the charge packets (33, 34) of the first subgroup that are present at that location.

6. A charge-coupled imager as claimed in claim 5, characterized in that the imaging section includes a color filter, in which the charge packets that are being joined in the horizontal CCD channel correspond to an identical color.

7. A charge-coupled imager as claimed in claim 4, characterized in that said means for selectively transporting charge packets of the first and the second subgroup to the horizontal CCD channel in two steps are made up of a Q-phase system of electrodes (1B, 2B, 3B, 4B) above the vertical CCD channels (25) (Q being a natural integral larger than 1), in which the last electrode (3B) of the vertical CCD channels associated with the first subgroup corresponds to a different phase than the last electrode (4B) of the vertical CCD channels associated with the second subgroup.

8. A charge-coupled imager as claimed in claim 4, characterized in that a part of the vertical CCD channels adjacent to the read-out section forms a memory which is shielded from incident light, which memory is present between the imaging section and the read-out section and whose number of rows is smaller than the number of rows in the imaging section.

9. A charge-coupled imager as claimed in claim 8 characterized in that a part of the vertical CCD channels are of the buried channel type and comprise a channel in the form of a layer (16) of a first conductivity type, which is bounded on the side opposite the surface by an adjacent layer (15) of a second, opposed, conductivity type, which layer itself is bounded by a substrate area (14) of the first conductivity type on the side opposite the layer of the first conductivity type.

10. A camera fitted with a charge-coupled imager as claimed in claim 9.

11. A charge-coupled imager comprising an imaging section, a read-out section, and means for reducing the number of charge packets for every row to be read, the imager being switchable between at least two read-out modes, wherein:
    the imaging section comprises image elements arranged in a two-dimensional pattern of m horizontal rows and n vertical columns wherein n and m are natural numbers;
    the read-out section comprises at least a first horizontal CCD channel disposed beside the two-dimensional pattern, a second horizontal CCD channel and vertical CCD channels interlineated within the pattern of image elements;
    the imager is operable so that every image element of a row is individually readable in a first read-out mode using the first horizontal CCD channel comprising at least n charge storage locations;
    the imager is further operable in a second read-out mode so that a lower horizontal sampling frequency is read from the read-out section than in the first read-out mode using a second horizontal CCD channel comprising only n–q charge storage locations wherein q is a natural number smaller than n;
    the n–q charge locations within the second horizontal CCD channel are substantially uniformly distributed over the width of the imaging section; and
    the width of each charge storage location in the second horizontal CCD channel is larger than the width of a charge storage location in the first horizontal CCD channel.

12. A charge-coupled imager as claimed in claim 11, wherein the two horizontal CCD channels are arranged on opposite sides of the imaging section.

13. A charge-coupled imager as claimed in claim 12, further comprising a memory matrix which is shielded from incident light the memory matrix being coupled between the imaging section and the second CCD channel, the memory matrix being operable to temporarily store charge packets, which have been generated in the imaging section during an integration period, before being read row by row.

14. A charge-couple imager as claimed in claim 13, wherein a number of rows in the memory matrix is lower than a number of rows in the imaging section.

15. A charge-coupled imager as claimed in claim 14, wherein:
   the memory matrix is made up of a number of juxaposed CCD channels having a width which corresponds to the overall width of a number of juxtaposed columns in the imaging section; and
   an interface between the imaging section and the memory matrix is arranged so that charge packets originating from several columns in the imaging section are combined upon being transported from the imaging section to the memory matrix.

16. A charge-coupled imager as claimed in claim 15, further comprising draining means for draining charge packets at the interface between the imaging section and the memory matrix, the draining means being operable to drain charge packets from columns lying between other columns of which charge packets which have been formed therein are to be stored in the memory matrix.

17. A charge-coupled imager as claimed in claim 16, wherein the imaging section is provided with a color filter disposed so that charge packets which are being combined correspond to an identical color and charge packets which are being drained correspond to different colors.

18. A charge-couple imager as claimed in claim 16, wherein the CCD channels in the imaging section are separated from each other by channel-bounding zones, said channel-bounding zones extending between the CCD channels of the imaging section and the CCD channels of the memory matrix at locations of columns whose charge packets are being drained.

19. A charge-coupled imager as claimed in claim 15, wherein a width of the CCD channels corresponds to a spacing between storage locations in the adjacent horizontal read-out channel.

* * * * *